United States Patent [19]
Yoshida et al.

[11] Patent Number: 4,802,112
[45] Date of Patent: Jan. 31, 1989

[54] MOS TRANSISTOR CIRCUIT

[75] Inventors: Toyohiko Yoshida; Tatsuya Ueda, both of Hyogo, Japan

[73] Assignee: Mitsubishi Denki Kabushiki Kaisha, Tokyo, Japan

[21] Appl. No.: 924,565

[22] Filed: Oct. 28, 1986

[30] Foreign Application Priority Data

Oct. 30, 1985 [JP] Japan .............. 60-245543

[51] Int. Cl.⁴ .............................. G06F 7/50
[52] U.S. Cl. .............................. 364/784
[58] Field of Search ............... 364/784, 786, 787, 788

[56] References Cited

U.S. PATENT DOCUMENTS

| | | | |
|---|---|---|---|
| 3,767,906 | 10/1973 | Pryor | 364/786 |
| 4,152,775 | 5/1979 | Schwartz | 364/786 |
| 4,471,454 | 9/1984 | Dearden et al. | 364/786 |
| 4,471,455 | 9/1984 | Oshkhunian et al. | 364/786 |
| 4,601,007 | 7/1986 | Uya et al. | 364/784 |
| 4,677,584 | 6/1987 | Steck | 364/784 |
| 4,685,079 | 8/1987 | Armer | 364/784 |

Primary Examiner—Gary V. Harkcom
Assistant Examiner—Dale M. Shaw
Attorney, Agent, or Firm—Lowe, Price, LeBlanc, Becker & Shur

[57] ABSTRACT

When a carry signal generated in an n-th bit is propagated to an (n+1)th bit, two n-MOS transistors ($12_{n+1}$ and $13_{n+1}$) connected by a signal line ($C_n$) are turned on to prompt transition of the signal line ($C_n$) to a zero potential, thereby to increase the speed for propagating the carry signal. When the signal line ($C_n$) propagates no carry signal, a p-MOS transistor ($11_{n+1}$) is turned on to pull up the signal line ($C_n$) to a supply potential $V_{CC}$, thereby to stabilize the potential thereof.

5 Claims, 2 Drawing Sheets

MOS TRANSISTOR CIRCUIT

BACKGROUND OF THE INVENTION

1. Field of the Invention

The present invention relates to a MOS transistor circuit, and more particularly, it relates to a MOS transistor circuit which is applied to, e.g., an arithmetic and logic unit such as an adder.

2. Description of the Prior Art

FIG. 1 is a schematic block diagram showing general structure of a conventional adder. This adder is adapted to simultaneously add up multiple-bit data A and multiple-bit data B, and is formed by a plurality of full adders connected with each other through carry signal lines C. Each full adder receives a single bit of the data A and a single bit of the data B, to perform single-bit addition. For example, an n-th bit full adder $FA_n$ receives an n-th bit $A_n$ of the data A and an n-th bit $B_n$ of the data B. The n-th bit full adder $FA_n$ is connected with an (n−1)th bit full adder $FA_{n-1}$ ahead thereof by a carry signal line $C_{n-1}$ while being connected with an (n +1)th bit full adder $FA_{n+1}$ subsequent thereto by a carry signal line $C_n$. The respective full adders output the results S of addition. For example, the n-th bit full adder $FA_n$ outputs the result $S_n$ of addition. The result of addition of the data A and B can be obtained by summing the results S of addition of the respective full adders.

In the aforementioned adder, each of the full adders substantially adds up the data A and B and a carry signal from the full adder ahead thereof, to generate a carry signal on overflow and transmits the same to the subsequent full adder. The so-called Manchester type carry propagation circuit has generally been employed in order to propagate such carry signals. The Manchester type carry propagation circuit is disclosed in "Introduction to VLSI Systems" by C. Mead and L. Conway, 1980, Addison-Wesley Publishing Co.

FIG. 2 is a circuit diagram partially showing the structure of an (n−1)th bit, an n−th bit and an (n +1)th bit of the conventional Manchester type carry propagation circuit. With respect to the structure of the n−th bit as shown in FIG. 2, an exclusive OR gate $1_n$ is supplied with an n−th bit $A_n$ of data A and an n−th bit $B_n$ of data B. Output $2_n$ from the exclusive OR gate $1_n$ is supplied as a propagate signal to the gate electrode of an n-MOS transistor $3_n$ and one input of an exclusive OR gate $4_n$. The n-MOS transistor $3_n$, which is adapted to propagate the carry signal, is interposed between a carry signal line $C_{n-1}$ from the (n−1)th bit and a carry signal line $C_n$ to the (n +1)th bit. The other input of the exclusive OR gate $4_n$ is connected with a carry signal line $C_{n-1}$ through an inverter $5_n$. The exclusive OR gate $4_n$ outputs a sum signal $S_n$, which represents the result of addition.

On the other hand, one input of a NOR gate $6_n$ is supplied with an inverted signal $\overline{A_n}$ of the n-th bit of the data A. The other input of the NOR gate $6_n$ is supplied with an inverted signal $\overline{B_n}$ of the n-th bit of the data B. Output $7_n$ from the NOR gate $6_n$ is supplied as a carry generate signal to the gate electrode of an n-MOS transistor $8_n$. One of conducting electrodes of the n-MOS transistor $8_n$ is connected with the carry signal line $C_n$ and the other one is grounded through an n-MOS transistor $9_n$. The n-MOS transistor $9_n$ is supplied in its gate electrode with a clock signal $\phi$. These n-MOS transistors $8_n$ and $9_n$ form a second MOS transistor switching circuit for driving the carry signal line $C_n$ in response to the carry generate signal $7_n$. A p-MOS transistor $10_n$ is interposed between a power supply $V_{CC}$ and the carry signal line $C_n$, to be supplied with a clock signal $\phi$ in its gate electrode. The p-MOS transistor $10_n$ forms a first MOS transistor switching circuit for precharging the potential of the carry signal line $C_n$ at the supply potential $V_{CC}$.

While the above description has been made on the structure of the n−th bit, the remaining bits are similar in structure to the n−th bit. In FIG. 2, corresponding parts of the respective bits are indicated by the same reference numerals, subscripts of which are varied with the bits.

Description is now made on the operation of the conventional circuit. This circuit is controlled by the clock signal $\phi$ to operate in a precharge phase and a discharge phase. Further, it is assumed that the carry signal flowing through each carry signal line C indicates that a carry occurs at a low level.

The following description of the operation is made with attention drawn to the (n −1)th bit and the n−th bit, while it is to be noted that the other bits perform similar operation.

When the clock signal $\phi$ goes low, the circuit enters a precharge phase, so that the n-MOS transistors $9_n$ and $9_{n-1}$ are turned off and the p-MOS transistors $10_n$ and $10_{n-1}$ are turned on. Thus, the carry signal lines $C_n$ and $C_{n-1}$ are precharged by the power supply $V_{CC}$. The propagate signals $2_n$ and $2_{n-1}$ and the carry generate signals $7_n$ and $7_{n-1}$ are determined in the same phase.

Then, when the clock signal $\phi$ goes high, the circuit enters a discharge phase so that the n-MOS transistors $9_n$ and $9_{n-1}$ are turned on and the p-MOS transistors $10_n$ and $10_{n-1}$ are turned off. Consider such case where the n−bit carry generate signal $7_n$ is at a low level and the (n −1)th bit carry generate signal $7_{n-1}$ is at a high level while the n-th bit propagate signal $2_n$ is at a high level. At this time, the n-MOS transistor $8_n$ is turned off and the n-MOS transistors $3_n$, $8_{n-1}$ and $9_{n-1}$ enter ON states. The electric charge on the carry signal line $C_{n-1}$ is discharged to the ground through the n-MOS transistors $8_{n-1}$ and $9_{n-1}$, while the electric charge on the carry signal line $C_n$ is discharged to the ground through the n-MOS transistors $3_n$, $8_{n-1}$ and $9_{n-1}$. Thus, the carry signals are propagated from low-order bits to high-order bits.

The sum in the respective bits can be obtained by XORing the inverted carry signal and the propagate signal.

In the conventional Manchester type carry propagation circuit as hereinabove described, the propagate signal $2_n$ is applied to the n-MOS transistor $3_n$ for carry propagation to discharge the electric charge on the high-order bit carry signal line $C_n$ through the carry propagation n-MOS transistor $3_n$, thereby to propagate the carry signal. When the carry signal line $C_{n-1}$ is at a high level, propagation of the carry signal from the carry signal line $C_{n-1}$ to $C_n$ is not required since the carry signal line $C_n$ is already at a high level by precharging. When, on the other hand, the carry signal line $C_{n-1}$ is at a low level, the electric charge on the carry signal line $C_n$ is discharged to the low-order bit through the n-MOS transistor $3_n$.

Consider such case where the carry signals are sequentially propagated to high-order bits. Even if the propagate signals of all bits simultaneously go high, considerable time is required by the resistance of the ON state of the carry propagation MOS transistors 3 when the carry signals are propagated through the multistage carry propagation transistors 3.

Although carry propagation velocity can be increased by reducing floating capacity of the carry signal lines C and decreasing the electric charges to be discharged, the potentials at the carry signal lines C are instabilized with respect to influence by other factors.

SUMMARY OF THE INVENTION

It is an object of the present invention to provide a MOS transistor circuit which can stably propagate logical output (e.g., carry signals) from logical circuits of respective bits at a high speed.

Briefly stated, provided according to the present invention is a MOS transistor circuit comprising a plurality of bits respectively provided with prescribed logical circuits, which bits are connected with each other by signal lines so that prescribed logical output obtained from each logical circuit is propagated to the logical circuit of the subsequent bit through the signal line. The MOS transistor circuit according to the present invention further includes a first MOS transistor switching circuit provided between a first potential source and each signal line for precharging the signal line, a second MOS transistor switching circuit provided between a second potential source and each signal line for driving the signal line in response to prescribed logical output, a third MOS transistor switching circuit provided between the first potential source and each signal line for stabilizing the potential at the signal line and a fourth MOS transistor switching circuit provided between the second potential source and each signal line for prompting transition of the potential at the signal line.

According to the present invention, potentials at signal lines connecting respective logical circuits can be stabilized while transition of the potentials at the signal lines can be performed at a high speed, thereby to stably propagate logical output derived from the logical circuits at a high speed.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
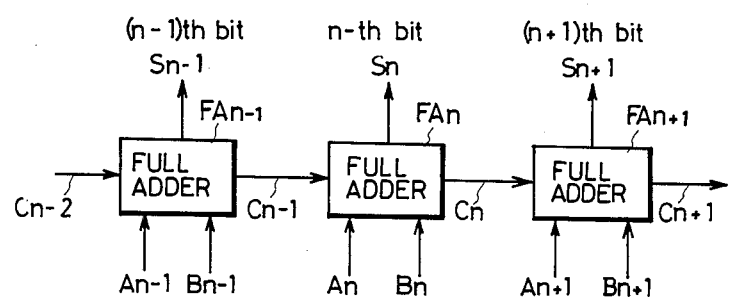
FIG. 1 is a schematic block diagram showing general structure of a well-known adder.
Figure 2:
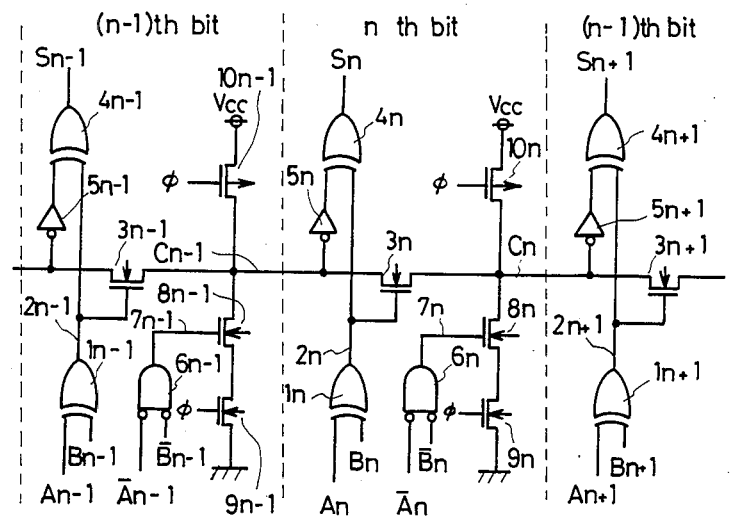
FIG. 2 is a circuit diagram showing a conventional Manchester type carry propagation circuit.
Figure 3:
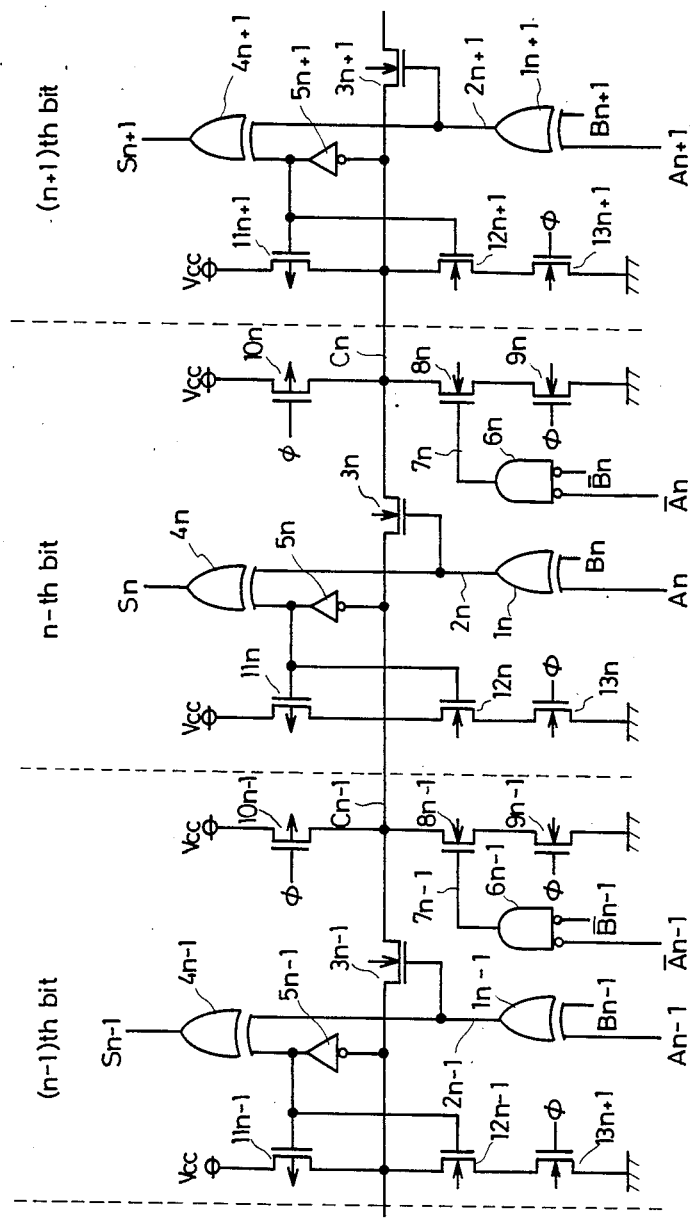
FIG. 3 is a circuit diagram showing an embodiment of the present invention.

FIG. 3 is a circuit diagram partially showing an embodiment of the present invention. Referring to FIG. 3, there is shown the structure of an (n−1)th bit, an n−th bit and part of an (n+1)th bit. This embodiment is similar to the prior art example as shown in FIG. 2 except for the points as hereinafter described, and corresponding parts are indicated by the same reference numerals while description thereof is appropriately omitted.

With respect to the structure of the n−th bit as shown in FIG. 3, output from an inverter $5_n$ is supplied to respective gate electrodes of a p-MOS transistor $11_n$ and an n-MOS transistor $12_n$. The p-MOS transistor $11_n$ is of small driving ability, and is interposed between a power supply $V_{CC}$ and a carry signal line $C_{n-1}$. This p-MOS transistor $11_n$ forms a third MOS transistor switching circuit for stabilizing the potential of the signal line $C_{n-1}$ at the supply potential $V_{CC}$ when the signal line $C_{n-1}$ propagates no carry signal. An end of the conducting electrode of an n-MOS transistor $12_n$ is connected to the carry signal line $C_{n-1}$ while the other end thereof is grounded through an n-MOS transistor $13_n$. The n-MOS transistor $13_n$ is supplied in its gate electrode with a clock signal $\phi$. The n-MOS transistors $12_n$ and $13_n$ form a fourth MOS transistor switching circuit for prompting transition, i.e., discharging of the electric charge on the signal line $C_{n-1}$ when the signal line $C_{n-1}$ propagates a carry signal. According to this embodiment, the aforementioned structure is added to the conventional circuit as shown in FIG. 2. The remaining bits are similar in structure to the n-th bit. Therefore, corresponding parts of the respective bits are indicated by the same reference numerals, subscripts of which are varied with the bits.

Description is now made on the operation of the aforementioned embodiment. Although the following description is made only on the operation of the (n−1)th, n−th and (n+1)th bits, it is to be noted that the remaining bits are similar in operation to the said bits. This circuit is controlled by the clock signal $\phi$ to operate in a precharge phase and a discharge phase similarly to the circuit as shown in FIG. 2. Further, it is assumed that the carry signal propagated through each carry signal line C indicates that a carry occurs at a low level.

When the clock signal $\phi$ goes low, the circuit enters a precharge phase so that n-MOS transistors $9_n$ and $9_{n-1}$ are turned off and p-MOS transistors $10_n$ and $10_{n-1}$ are turned on, whereby carry signal lines $C_n$ and $C_{n-1}$ are precharged. At this time, the p-MOS transistor $11_n$ of small driving ability enters an ON state. Propagate signals $2_n$ and $2_{n-1}$ and carry generate signals $7_n$ and $7_{n-1}$ are determined in the same phase.

When the clock signal $\phi$ goes high, the circuit enters a discharge phase so that the n-MOS transistors $9_n$ and $9_{n-1}$ are turned on and the p-MOS transistors $10_n$ and $10_{n-1}$ are turned off. Consider such case where the carry generate signal $7_n$ of the n-th bit is at a low level and the carry generate signal $7_{n-1}$ of the (n−1)th bit is at a high level while the propagate signal $2_n$ of the n-th bit is at a high level. At this time, an n-MOS transistor $8_n$ enters an OFF state and n-MOS transistors $3_n$, $8_{n-1}$ and $9_{n-1}$ enter ON states. The electric charge on the carry signal line $C_{n-1}$ is discharged through the n-MOS transistors $8_{n-1}$ and $9_{n-1}$, and the electric charge on the carry signal line $C_n$ is discharged through the n-MOS transistors $3_n$, $8_{n-1}$ and $9_{n-1}$. When the carry signal line $C_n$ is at voltage lower than a prescribed level, an n-MOS transistor $12_{n+1}$ of the (n+1)th bit is turned on to prompt discharging of the electric charge on the carry signal line $C_n$. At this time, an n-MOS transistor $13_{n+1}$ is turned on by the clock signal $\phi$. Namely, the n-MOS transistor $12_{n+1}$ and $13_{n+1}$ further increase the speed for discharging the electric charge on the carry signal line $C_n$ by providing positive feedback to the carry signal line $C_n$. Thus, the carry signals can be propagated at a high speed.

When the propagate signal $2_n$ and the carry generate signal $7_n$ are both at low levels in the discharge phase, both of the n-MOS transistors $3_n$ and $8_n$ are in OFF state, whereby the carry signal line $C_n$ is maintained at a high level. Therefore, a p-MOS transistor $11_{n+1}$ of small driving ability is in an ON state to pull up the carry signal line $C_n$, whereby the potential at the carry signal line $C_n$ is stabilized.

Although the present invention has been applied to an adder in the aforementioned embodiment, the same is applicable not only to the adder but to other arithmetic and logic unit such as a subtracter or a multiplier. In other words, the present invention can be applied to an electronic circuit which comprises a plurality of logical circuits connected by signal lines to propagate prescribed logical output from each of the logical circuits to the subsequent one.

Although the present invention has been described and illustrated in detail, it is clearly understood that the same is by way of illustration and example only and is not to be taken by way of limitation, the spirit and scope of the present invention being limited only by the appended claims.

What is claimed is:

1. A MOS transistor circuit comprising a plurality of bits connected to a plurality of logic circuits, said circuits being connected to each other by signal lines, for propagating prescribed output signals obtained from each of said logic circuits, to the next subsequent circuit through said signal lines, said MOS transistor circuit further including:

a first MOS transistor switching circuit provided between a first potential source and each said signal line for precharging the potential of each said signal line at the potential of said first potential source;

a second MOS transistor switching circuit provided between a second potential source different in potential from said first potential source and each said signal line for driving one of said signal lines in response to said prescribed logical output;

a third MOS transistor switching circuit provided between said first potential source and each said signal line and driven dependent on the potential of said each said signal line for stabilizing the potential of said each said signal line at the potential of said first potential source; and a fourth MOS transistor switching circuit provided between said second potential source and each said signal line and driven dependent on the potential of said each said signal line for prompting transition of the potential of said signal lines.

2. A MOS transistor circuit in accordance with claim 1, wherein each of said logical circuits is formed as an arithmetic and logic circuit for performing arithmetic and logic operation bitwisely on multiple-bit data, said prescribed logical output is a carry signal outputted from said arithmetic and logic circuit, said MOS transistor circuit forming a Manchester type carry operation circuit for propagating said carry signal.

3. A MOS transistor circuit in accordance with claim 1, wherein said third MOS transistor switching circuit includes a first MOS transistor which is turned on when one of said signal lines is substantially at the same potential with said first potential source while being turned off when said signal line is substantially at the same potential with said second potential source, and said fourth MOS transistor switching circuit is formed by serially connecting a second MOS transistor which is turned off when one of said signal lines is substantially at the same potential with said first potential source while being turned on when said signal line is substantially at the same potential with said second potential source and a third MOS transistor which is turned on when said second MOS transistor switching circuit is in a driven state.

4. A MOS transistor circuit in accordance with claim 3, wherein said first MOS transistor is formed by that of small driving ability.

5. A MOS transistor circuit in accordance with claim 1, wherein said first potential source is selected to be higher in potential than said second potential source.

* * * * *